July 16, 1940.　　　　F. M. STADER　　　　2,208,283

FASTENING DEVICE

Filed April 25, 1938

INVENTOR
FLORENCE M. STADER

BY *Whittemore Hulbert Belknap*

ATTORNEYS

Patented July 16, 1940

2,208,283

UNITED STATES PATENT OFFICE 2,208,283

FASTENING DEVICE

Florence M. Stader, Plymouth, Mich.

Application April 25, 1938, Serial No. 204,152

7 Claims. (Cl. 24—103)

The invention relates to fasteners adapted particularly for use with wearing apparel.

The invention has for one of its objects to provide an improved fastener for securing one article to another. The invention has for another object to provide the fastener with an improved guard for the pointed end. The invention has for a further object to provide an improved means for connecting the fastener to a fastening element, such as a button, buckle or the like.

These and other objects of the invention will become apparent from the following description, taken in connection with the accompanying drawing, in which Figure 1 is a perspective view of a fastening device illustrating an embodiment of my invention;

Figure 1:
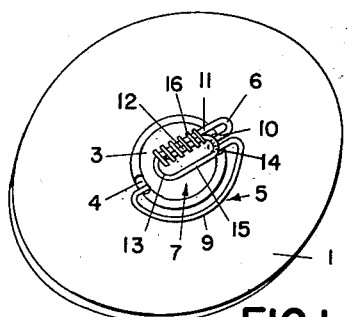
Figure 2:
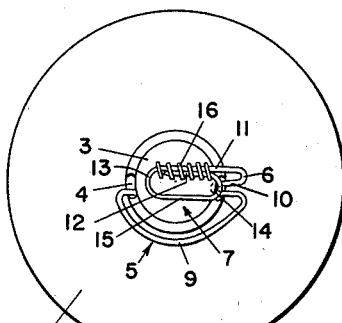
Figure 2 is a plan view thereof.
Figure 3:
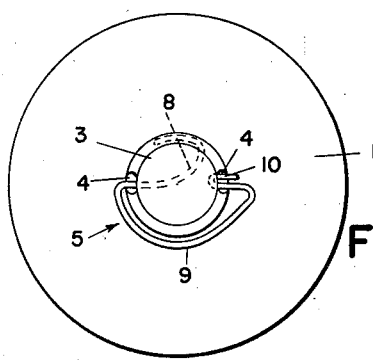
Figure 3 is a plan view thereof with the article attachment portion of the fastener removed.
Figure 4:
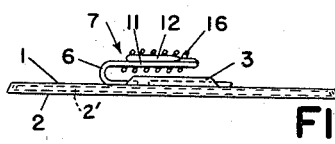
Figure 4 is a side elevation thereof.

As illustrated in Figures 1, 2, 3 and 4, the fastening device comprises a fastener and a fastening element and the fastener is designed to secure a fastening element, such as a button, buckle, or the like, to wearing apparel, such as a coat. The button in the present instance has the bottom 1 and the top 2, both being formed of metal. The bottom is provided with the boss 3 diametrically opposite side walls of which are formed with the holes 4, thereby providing spaced attachment members. The fastener is formed of a continuous length of wire and has the base portion 5 insertable into and extending within the attachment members, the shank portion 6 extending generally transversely from the base portion, and the article attachment portion 7 connected to the shank portion.

The base portion is formed of the U-shaped terminal part 8 which is threaded through one of the holes 4 and is located inside the boss 3 against the filler 2' in the top 2. The base portion is also formed of the curved or generally semi-circular part 9 extending partially around the boss 3 against the bottom 1. The base portion is further provided with the U-shaped part 10 extending into the other hole 4, the curved part 9 being resilient and the U-shaped part 10 being adapted to snap into its hole. The shank portion 6 extends generally transversely from the base portion and in a direction away from the button and the article attachment portion 7 is connected to the shank portion to be spaced from the boss 3. The article attachment portion is formed of an elongated loop which extends substantially parallel to the boss. The loop is formed of the parts 11 and 12 contiguous and substantially parallel to each other, the curved parts 13 and 14 connecting respectively into the parts 11 and 12, and the part 15 extending substantially parallel to the parts 11 and 12 and connecting into the curved parts 13 and 14. The part 11 connects into the shank portion 6 and the part 12 terminates in a pointed end. The construction of the loop is such that the part 12 may be threaded through an article, such as a coat or the like, and the fastener swung or rotated to engage the part 15 with the article.

For the purpose of preventing accidental disengagement of the fastener from the article and also for the purpose of covering the pointed end, I have provided the flexible guard 16 which is sleeved upon the loop. This guard may be formed of various materials, but, as shown, is a coiled wire which when in operative position encircles the contiguous parts 11 and 12 including the pointed end. To clear the pointed end, the guard is movable along the curved part 13 on to the part 15.

Figure 5:
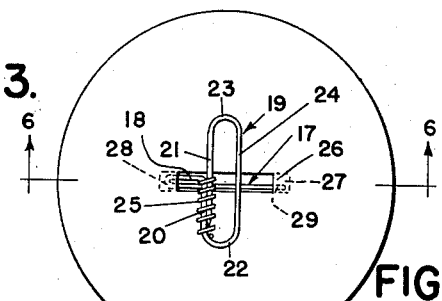
Figure 5 is a plan view of a fastening device illustrating another embodiment of my invention.
Figure 6:
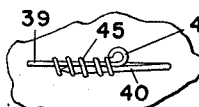
Figure 6 is a cross section on the line 6—6 of Figure 5.

In the modification illustrated in Figures 5 and 6, the fastener is formed of a continuous length of wire and has the base portion 17, the shank portion 18 extending generally transversely from the base portion, and the article attachment portion 19 connected to the shank portion. The article attachment portion is formed of an elongated loop constructed in the same manner as that of the modification illustrated in Figures 1, 2, 3 and 4. This loop has the parts 20 and 21 which are contiguous and substantially parallel to each other, the curved parts 22 and 23 connecting into the contiguous parts 20 and 21 respectively, and the part 24 extending between the curved parts. The part 20 connects into the shank portion 18 and the part 21 terminates in a pointed end. 25 is the flexible guard movable along the loop in the same manner as the flexible guard 16 and adapted in operative position to encircle the contiguous parts 20 and 21, including the pointed end.

The base portion 17 before assembly with the fastening element, such as a button, buckle, or the like, is U-shaped and the distance between its ends at this time is such that it may be inserted between the spaced attachment members 26 of the button which are formed of the recessed portions 27 with the recesses facing toward each other. After this initial assembly, the base portion 17 is flattened out or straightened to engage its U-shaped part 28 in one of the recessed portions and its end part 29 in the other of the recessed portions. At this time, the base portion is permanently secured to the fastening element.

Figure 7:
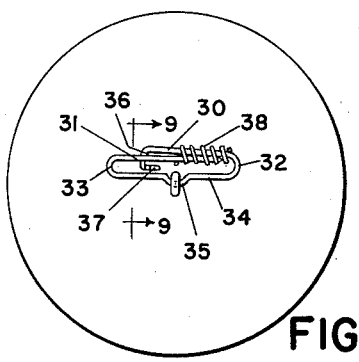
Figure 7 is a plan view of a fastening device illustrating another embodiment of my invention.
Figure 8:
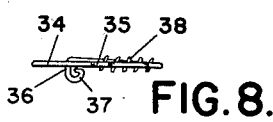
Figure 8 is a side view thereof.
Figure 9:
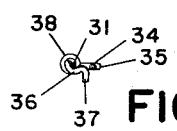
Figure 9 is a side view at right angles to Figure 8.

Figures 7, 8 and 9 illustrate another embodiment of my invention in which the fastener is also formed of a continuous length of wire. The fastener is formed of an elongated loop having the parts 30 and 31 contiguous and substantially parallel to each other, the curved parts 32 and 33 connecting respectively into the contiguous parts 30 and 31, and the part 34 connecting the curved parts. The part 34 is provided with the V-shaped part 35 which forms the base for attachment to the fastening element, such as a button, buckle, or the like, and this V-shaped part serves to locate the button relative to the fastener. The contiguous part 31 terminates in a pointed end, while the contiguous part 30 has at its end the curved part 36 which extends transversely of and partially around the contiguous part 31 and a finger engaging part 37 which extends transversely of the curved part 36. The construction is such that by pressing upon the finger engaging part 37 and moving the same transversely of the contiguous part 30 the part 36 presses upon the contiguous part 31 and has a cam action thereon to deflect the same so that its pointed end will be laterally spaced from the contiguous part 30. 38 is the flexible guard sleeved upon the loop and adapted to encircle the contiguous parts including the pointed end when in operative position and to be moved back over the curved part 32 to clear the pointed end when in inoperative position. This fastener may also be used to secure two articles or different parts of the same article of wearing apparel together.

Figures 10, 12:
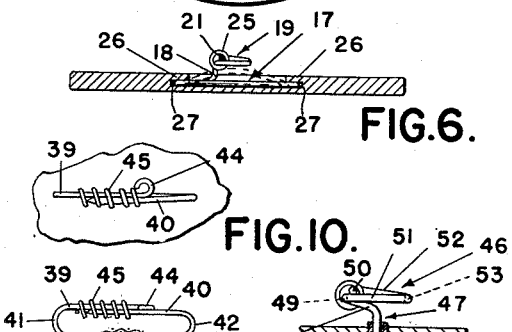
Figure 10 is a plan view of a fastening device illustrating another embodiment of my invention.
Figure 12 is a view similar to Figure 6 illustrating another embodiment of my invention.
Figure 11:
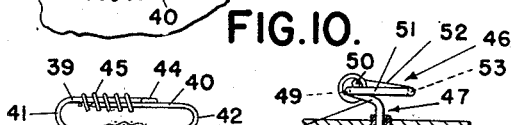
Figure 11 is a side view thereof.

Figures 10 and 11 illustrate another embodiment adapted to be used for the same purposes as the embodiment of Figures 7, 8 and 9, and in which the fastener is also formed of a continuous length of wire and is in the nature of a loop having the parts 39 and 40 which are contiguous and substantially parallel to each other, the curved parts 41 and 42 connecting respectively into the parts 39 and 40, and the part 43 connecting the curved parts and serving as the part for engaging an article, such as the fastening element or wearing apparel. The contiguous part 40 terminates in a pointed end and the contiguous part 39 terminates in a finger engaging part 44 which extends transversely of the loop. The finger engaging part is normally positioned so that upon being depressed toward the part 43 it engages the contiguous part 40 to flex the same to space its pointed end from the contiguous part 39. This embodiment is also provided with the flexible guard 45 which in operative position encircles the contiguous parts 39 and 40 including the pointed end and which can be moved around the curved part 41 on to the part 43 to inoperative position, at which time it clears the pointed end.

In the modification illustrated in Figure 12, the fastener is also formed of a continuous length of wire and has the article attachment portion 46, the shank portion 47 extending generally transversely thereof, and the base portion 48. The article attachment portion is formed in the same manner as that of the modification illustrated in Figures 5 and 6 and comprises the parts 49 and 50 which are contiguous and substantially parallel to each other, the curved parts 51 and 52 connecting respectively into the contiguous parts 49 and 50, and the part 53 connecting the curved parts. The shank portion is provided with the inclined part 54 for locating the straight part of the shank connecting into the base portion in alignment substantially with the middle of the loop of the article attachment portion. The base portion is formed of the sleeve 55 which is permanently secured on the end of the straight part of the shank portion and it is externally threaded for threadedly engaging the fastening element 56, such as a button, buckle, or the like.

What I claim as my invention is:

1. A fastener for securing to an article a fastening element having a boss at one side thereof provided with spaced holes, said fastener comprising a portion for attachment to the article, and a base portion having an end insertable into and extending within one of said holes, a curved part extending partially around said boss, and a projecting part insertable into and extending within another of said holes.

2. A fastener for securing to an article a fastening element having a boss at one side thereof provided with spaced holes, said fastener being formed of a continuous length of wire and having a base portion formed with an end insertable into and extending within one of said holes, a curved part extending partially around said boss, and a U-shaped part extending within and engaging the other of said holes, said curved part being resilient, a portion extending generally transversely from said U-shaped part, and an article attachment portion connecting into said generally transversely extending portion.

3. A fastener for securing to an article a fastening element having a boss at one side thereof provided with spaced holes, said fastener having an end insertable into and extending within one of said holes, a resilient curved part extending partially around said boss, a U-shaped part insertable into and extending within another of said holes, and a portion extending from said U-shaped part for attachment to the article.

4. A fastener for securing to an article a fastening element provided at one side thereof with spaced holes opening toward the outer edge of the fastening element, said fastener comprising a portion for attachment to the fastening element having an end part insertable into and extending within one of said holes, a projecting part insertable into and extending within another of said holes, a resilient part connecting said end part and said projecting part, and urging said two last mentioned parts toward each other, and a portion for attachment to the article extending from said projecting part.

5. A fastener for securing to an article a fastening element having a boss at one side thereof provided with spaced holes, said fastener being formed of a continuous length of wire and having a base portion formed with an end insertable into and extending within one of said holes, a resilient curved part extending partially around said boss, a U-shaped part adapted to be sprung into another of said holes, a portion extending generally transversely from said U-shaped part, and an article attachment portion connecting into said generally transversely extending portion and extending substantially parallel to the surface of the fastening element, said article attachment portion comprising an elongated loop terminating in a pointed end extending contiguous and substantially parallel to one side of the loop.

6. A fastener for securing one article to another, said fastener comprising a portion for attachment to one article and a second portion for attachment to the other article, said second portion having a first part terminating in a pointed end and a second part contiguous and substantially parallel to said first part and having a curved portion extending beyond the pointed end of said first part, and a flexible guard in its inoperative position encircling the curved portion of said second part and having its entire length positioned beyond the pointed end of said first part, said flexible guard being adapted to be moved bodily around said curved portion to encircle the pointed end of said first part and the contiguous portion of said second part.

7. A fastener for securing to an article a fastening element having spaced openings at one side thereof, said fastener being formed of a continuous length of wire and having a pase portion insertable into and extending within said spaced openings, a shank portion extending generally transversely from said base portion, an article attachment portion extending from said shank portion and comprising a complete loop terminating in a pointed end portion extending contiguous and substantially parallel to another portion of said loop, and a flexible guard encircling said pointed end portion and the contiguous portion of the loop in its operative position and adapted to be bodily moved around said loop and normally maintained in inoperative position with its entire length positioned beyond the extremity of said pointed end portion.

FLORENCE M. STADER.